(12) United States Patent
Anselmi et al.

(10) Patent No.: US 8,840,243 B2
(45) Date of Patent: Sep. 23, 2014

(54) EYEGLASSES WITH FRAME COUPLED TO RETAINER STRAP OR BAND WHICH CAN SEPARATE UNDER TENSION

(71) Applicant: Artsana S.p.A., Grandate (CO) (IT)

(72) Inventors: Lorenzo Anselmi, Varese (IT); David Scheinberg, Carlisle, MA (US)

(73) Assignee: Artsana S.p.A., Grandate (CO) (IT)

( * ) Notice: Subject to any disclaimer, the term of this patent is extended or adjusted under 35 U.S.C. 154(b) by 76 days.

(21) Appl. No.: 13/777,509

(22) Filed: Feb. 26, 2013

(65) Prior Publication Data

US 2013/0242252 A1    Sep. 19, 2013

Related U.S. Application Data

(63) Continuation of application No. PCT/IB2010/003079, filed on Nov. 29, 2010.

(30) Foreign Application Priority Data

Sep. 6, 2010   (IT) .......................... MI2010A001607

(51) Int. Cl.
  *G02C 3/00*   (2006.01)
(52) U.S. Cl.
  USPC .............................. 351/156; 351/157; 2/452
(58) Field of Classification Search
  USPC ................. 351/156, 157, 41, 111, 116; 2/452
  See application file for complete search history.

(56) References Cited

U.S. PATENT DOCUMENTS

| 5,406,340 | A  | * | 4/1995 | Hoff ............................... 351/156 |
| 5,918,351 | A  |   | 7/1999 | Chou |
| 7,059,717 | B2 | * | 6/2006 | Bloch ........................... 351/119 |
| 7,427,133 | B2 |   | 9/2008 | Carter |
| 7,654,666 | B2 |   | 2/2010 | Stanley et al. |
| 2007/0242214 | A1 |   | 10/2007 | Carter |
| 2007/0279579 | A1 |   | 12/2007 | Stanley et al. |

FOREIGN PATENT DOCUMENTS

| EP | 1672408 | A2 | 6/2006 |
| FR | 1269683 | A  | 8/1961 |
| WO | 9624315 | A1 | 8/1996 |
| WO | 0225354 | A1 | 3/2002 |

* cited by examiner

*Primary Examiner* — Hung Dang
(74) *Attorney, Agent, or Firm* — King & Schickli, PLLC

(57) ABSTRACT

Eyeglasses comprising a frame (1) intended to support a pair of lenses (2) and having lateral ends (12) provided with slots (13), said frame (1) intended to be coupled to a retainer strap or band (3), with opposing free ends (5), which, when worn by the user around the head, allows him to wear the eyeglasses. A connecting member is provided (10) coupled to at least one of the free ends (5) of the aforementioned band (3), said connecting member (10) having an elongated body (15) with a portion (16) bent parallel to said body (15) and elastically movable in relation to it, said bent portion (16) intended to be inserted into one of the slots (13) provided on the lateral ends (12) of the frame (1) and being separable from it, deforming elastically if the band or strap (3) or the frame is subjected to tensile force.

10 Claims, 2 Drawing Sheets

EYEGLASSES WITH FRAME COUPLED TO RETAINER STRAP OR BAND WHICH CAN SEPARATE UNDER TENSION

This invention relates to a pair of eyeglasses according to the preamble of the main claim.

As is known, the eyeglasses comprise a frame supporting the lenses. Such eyeglasses are usually worn by a user by the hinged arms at the lateral ends on the opposite sides of the frame. There are however also known eyeglasses in which the frame is not connected to supporting arms, but to a strap or band, generally of textile, positioned around the user's head, allowing the user to wear the eyeglasses.

With reference to this latest manufacturing method, the strap or band is usually present in the form of a strip (for example of textile) of which the free ends are inserted in the slots located on the lateral ends of the frame. These free bodies have a portion of hook-and-loop tape (known by the commercial name Velcro) intended to attach to a second portion of said tape joined to the aforementioned strip at a position at a distance from the free ends.

Thus, once the free ends of the band or strip are inserted in the slots of the frame, they are folded onto the band so that the two portions of the hook-and-loop tape match up and connect, attaching the band to the frame.

Such a solution, although very simple to manufacture and use, has highlighted a potential risk of strangulation if the eyeglasses become hooked on an obstacle. Such a possibility is even more relevant when a pair of eyeglasses with a retainer band is worn by a child while playing or practicing a sport.

In addition, the known solution does not guarantee a correct and safe use of the eyeglasses (as the free ends of the strap can separate from the eyeglasses when they are worn), nor does the solution guarantee a sufficiently narrow production tolerance because the productive variability of Velcro does not guarantee that two parts of said hook-and-loop tape of equal length have the same mechanical strength, nor finally does it guarantee a coupling constancy between the portions of the abovementioned hook-and-loop tape (which actually decreases over time).

The purpose therefore of this invention is to offer a pair of eyeglasses with a frame coupled to a retainer band or strap that overcomes the problems of the equivalent known solutions.

In particular, the object of the invention is to provide a pair of eyeglasses in which the retainer strap or band can safely break away from the frame if said strap or frame is subjected to tension.

Another purpose is to provide a pair of eyeglasses with a retainer strap or band that offers safety of use to the users and that ensures a constancy of attachment between the parts over time.

These and other objects that will be clear to the expert in the art are achieved by the eyeglasses according to the associated claims.

For a better understanding of this invention, for purely illustrative, but not limitative purposes, the following drawings are attached, in which.

Figure 1:
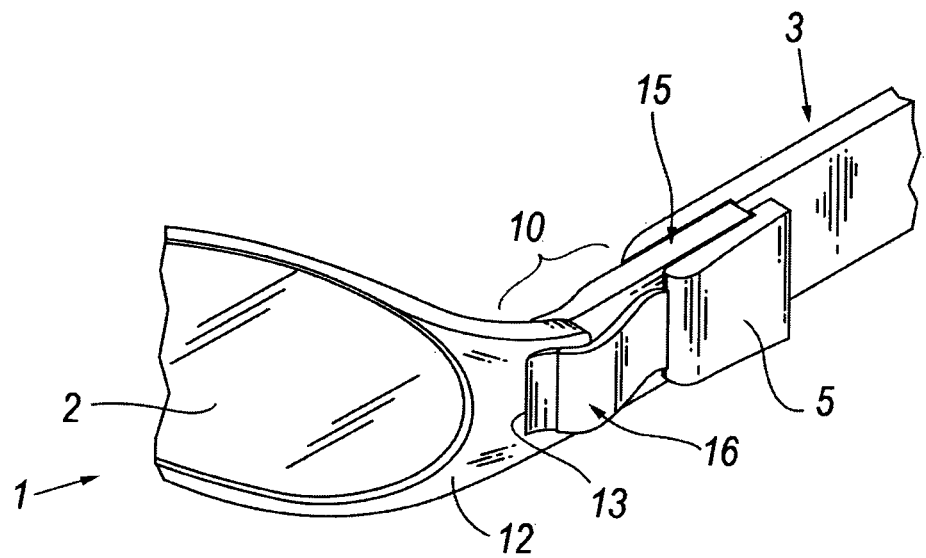
FIG. 1 shows a partial perspective view of one side of the eyeglasses manufactured according to the invention.
Figure 3:
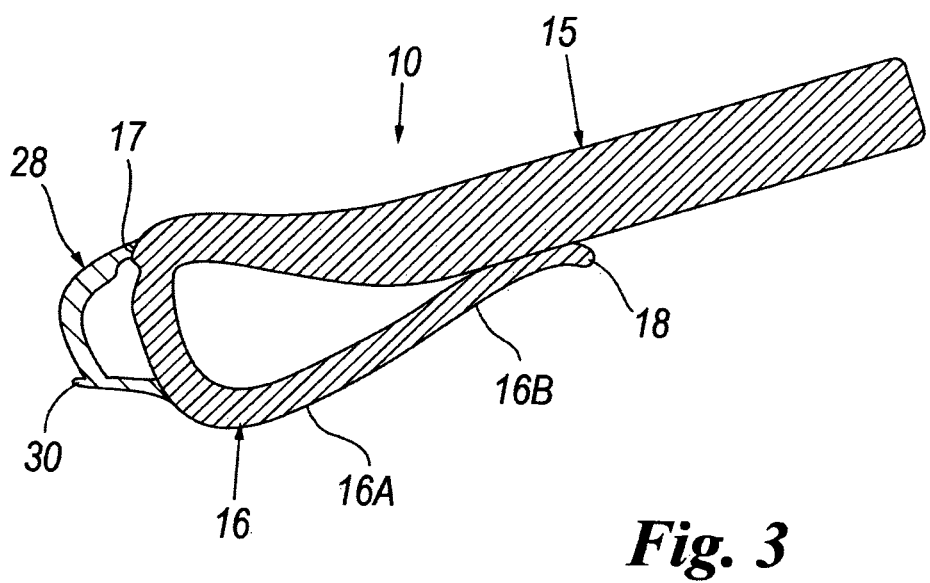
FIG. 3 shows a top view of a part of the eyeglasses according to the invention.
Figure 2:
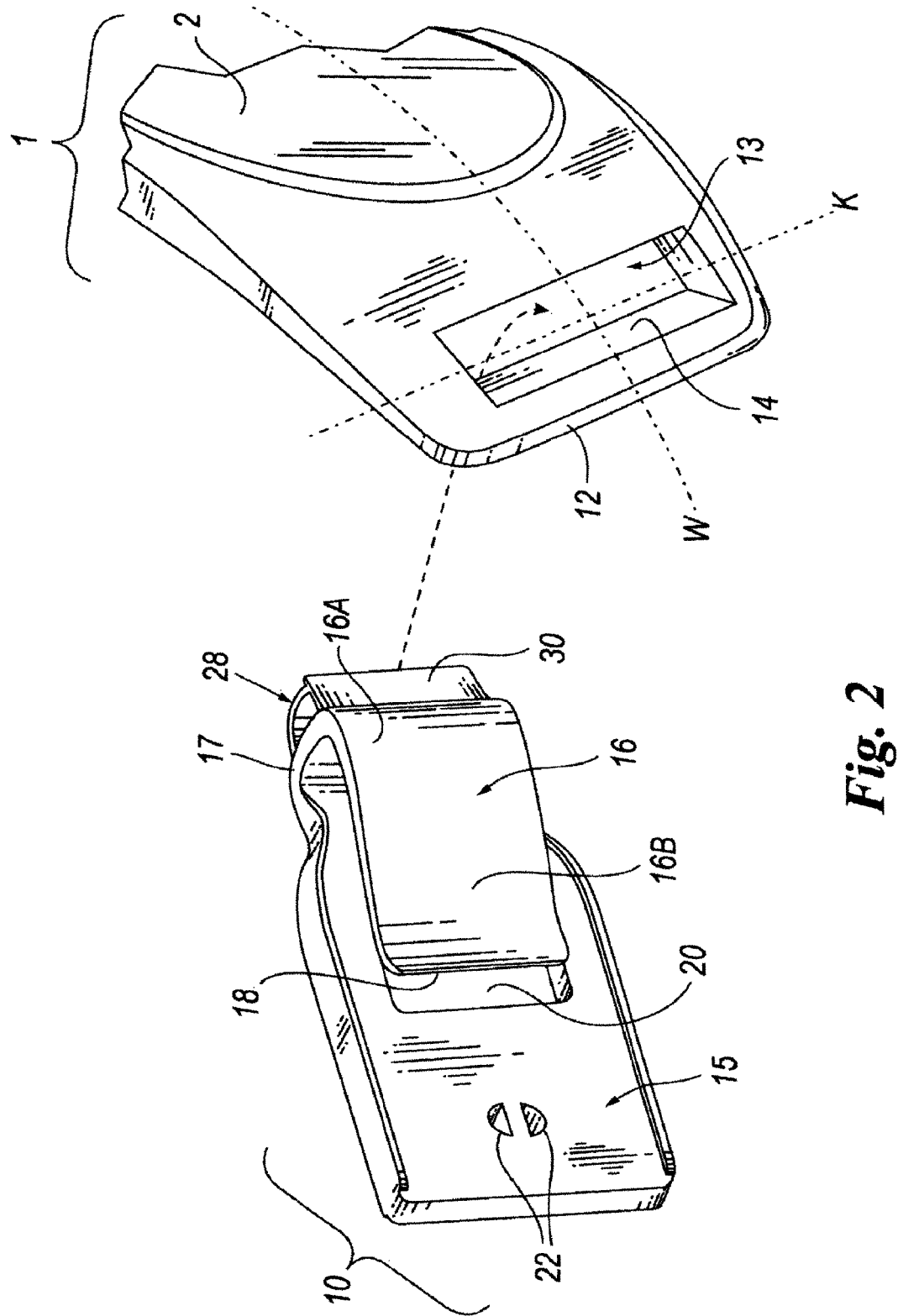
FIG. 2 shows an exploded perspective view of another part of the eyeglasses manufactured according to the invention with parts not shown for better clarity.

With reference to the cited figures, according to the invention the eyeglasses comprise a frame or mount 1 intended to support lenses 2. The eyeglasses are worn by a user through the use of a strap or band 3, for example of textile, having an elongated shape, in a strip with opposing free ends 5.

At least one of these ends is separated from the frame 1 and is connected to the latter using a single-piece connecting member 10, preferably of plastic material. Both ends 5 of the band 3 are coupled, by means of a corresponding member 10, to the frame 1; if only one end of the band 3 is joined to a corresponding member 10, the other end is attached in any known manner directly to the frame.

More specifically, the frame 1 has lateral ends 12 next to which slots 13 are provided along an axis K perpendicular to the transverse axis W of the frame. These slots 13 comprise, on one side, a sloping flat part 14 tapering toward the inside of the slot.

A corresponding connecting member 10 is attached to this slot. More specifically, the connecting member comprises an elongated body 15 having a portion 16 bent parallel to this body and elastically movable with respect to it; the bent portion 16 protrudes from one end 17 of the body 15 and runs along a first part 16A (connected to the body), deviating from this body with a second part 16B approaching it and with an end 18 curving away from the aforementioned body. Due to the shape of portion 16, it is elastically moveable relative to the body 15 and may be inserted in the corresponding slot 13 of the frame 1. This insertion is facilitated also by the lateral sloping flat part 14 of the slot 13; after coupling, the lateral end 12 of the frame 1 is positioned between the first part 16A of the portion 16 and the body 15.

The body 15 comprises a large hole 20 for passage of the corresponding end 5 of the band or strap 3. The first part of a hook-and-loop strap (not shown) is joined to this end, a second part (also not shown) of which is joined to the aforementioned strap 3; in this way, inserting the end 5 of the band 3 through hole 20 and folding this band back on itself, the two parts of hook-and-loop strap can be joined such as to couple them and fix the band to the connecting member 10. The strap 3 may alternatively be sewn to itself (and thus attached to the member 10) by passing binding threads through the holes 22 in the body 15.

The invention is now assumed to be in use. In this case, the member 10 is coupled to the frame 1 as indicated. The user can thus wear the glasses by placing the band or strap 3 around his head.

If the frame 1 or the band 3 is subjected to tension beyond a certain limit force (preferably greater than 20 N and less than 25 N), the bent portion 16 would tend to slide, with its end part 18 (bent away from the body 15) on the lateral end 12 of the frame 1, on the lateral sloping flat part 14 of the frame and would separate from it, preventing injury to the user.

The user can then reattach the parts by inserting part 16 in the slot 13 of the frame 1.

The invention allows the use of the eyeglasses joined with a band or strap (for example of textile, which has the advantage of being flexible) while offering greater safety of use. In case of tension, for example of the frame, the band 3 separates from the same frame avoiding problems to the user.

The safety features of the eyeglasses, furthermore, are constant over time because they are entrusted to a single-piece member.

This member, preferably (but not necessarily) has an annular portion 28 connected to the end 17 of its body 15 and protruding from it. This portion functions as an elastic element for the (elastic) movement of the portion 16 of this body.

To this portion 28 is advantageously coupled to a projection 30, protruding from the portion, intended to interfere with the frame 1 when the member 10 detaches from the frame. This portion, according to its dimension, allows the value of the detaching force to be predefined and kept constant over time.

Other additions and variations may be made to the invention starting from the description such as to provide variations to the invention as defined by the claims that follow.

The invention claimed is:

1. Eyeglasses comprising a frame (1) used to support a pair of lenses (2) and having lateral ends (12) provided with slots (13), said frame (1) intended to be coupled to a retainer strap or band (3), having opposing free ends (5), which, worn by a user around his head, allows him to wear the eyeglasses, characterized in that a connecting member (10) is provided coupled to at least one of the free ends (5) of the aforementioned band (3), said connecting member (10) having an elongated body (15) with a bent portion (16) parallel to said body (15) and elastically movable with respect to it, said bent portion (16) being suitable to be inserted in one of the slots (13) provided on the lateral ends (12) of the frame (1) and being separable from it, deforming elastically, if the band or strap (3) or the frame is subjected to tensile force.

2. Eyeglasses as provided in claim 1, characterized in that the bent portion (16) protrudes from one end (17) of the elongated body (15), this portion including a first part (16A) connected to the aforementioned body (15), deviating from it and a second part (16B) approaching said body (15).

3. Eyeglasses as provided in claim 2, characterized in that said second part (16B) of said bent portion (16) ends with an end part (18) curved away from the aforementioned body (15).

4. Eyeglasses as provided in claim 2, characterized in that the end (17) of the elongated body (15) to which the bent portion is connected has an annular portion (28) projecting from this end.

5. Eyeglasses as provided in claim 4, characterized in that this annular portion (28) has a projection (30) intended to cooperate with the frame (1) at the act of detachment of the member (10) from the frame.

6. Eyeglasses as provided in claim 1, characterized in that the body (15) of the said connecting member (10) has an opening (20) for coupling with an end (5) corresponding to the retainer strap or band (3).

7. Eyeglasses as provided in claim 6, characterized in that the end (5) of the retainer strap or band (3) is joined to the first part of the hook-and-loop tape, the second part of it being bound along said retainer strap or band (3) in a position distant from said end (5).

8. Eyeglasses as provided in claim 1, characterized in that the retainer strap or band (3) is sewn to the elongated body (15) of the connecting member (10).

9. Eyeglasses as provided in claim 1, characterized in that each slot (13) of the frame (1) has a sloping flat part (14) tapering off to the inside of the same slot.

10. Eyeglasses as provided in claim 1, characterized in that the tensile force which causes the coupling member (10) to detach from the frame (1) is at least equal to or greater than 20 N and less than 25 N.

* * * * *